Jan. 2, 1968  S. W. LUDWIKOWSKI  3,361,467
SPRING MOUNTED BUMPER
Filed Nov. 9, 1964

INVENTOR
STANLEY W. LUDWIKOWSKI
BY
ATTORNEY

United States Patent Office 3,361,467
Patented Jan. 2, 1968

3,361,467
SPRING MOUNTED BUMPER
Stanley W. Ludwikowski, 2302 W. 11th St.,
Los Angeles, Calif. 90006
Filed Nov. 9, 1964, Ser. No. 409,636
1 Claim. (Cl. 293—85)

This invention relates to spring bumpers for automobiles, and in particular to coiled metal springs having reinforcing cores of compressible rubber-like material.

One object of the invention is to provide reinforced coiled springs for use between the frame of an automobile and a bumper bar. Another object is to provide a composite spring structure which includes a compressible resilient core of rubber-like material which will absorb severe impact shocks. Another object is to provide composite coiled springs with compressible cores whose resistance to compressive forces increases rapidly with the contraction of the coil. A further object is to provide a structure for an automobile bumper which includes coiled steel springs with compressible sponge rubber cores and also supplemental blocks of sponge rubber, whereby to absorb the severe shocks of collisions.

These and other objects are attained by my invention which will be understood from the following description, reference being made to the accompanying drawing in which FIG. 1 is a perspective view of a front (or rear) portion of an automobile with parts broken away and showing the attachment of my new bumper structure to the automobile frame;

Figure 1:
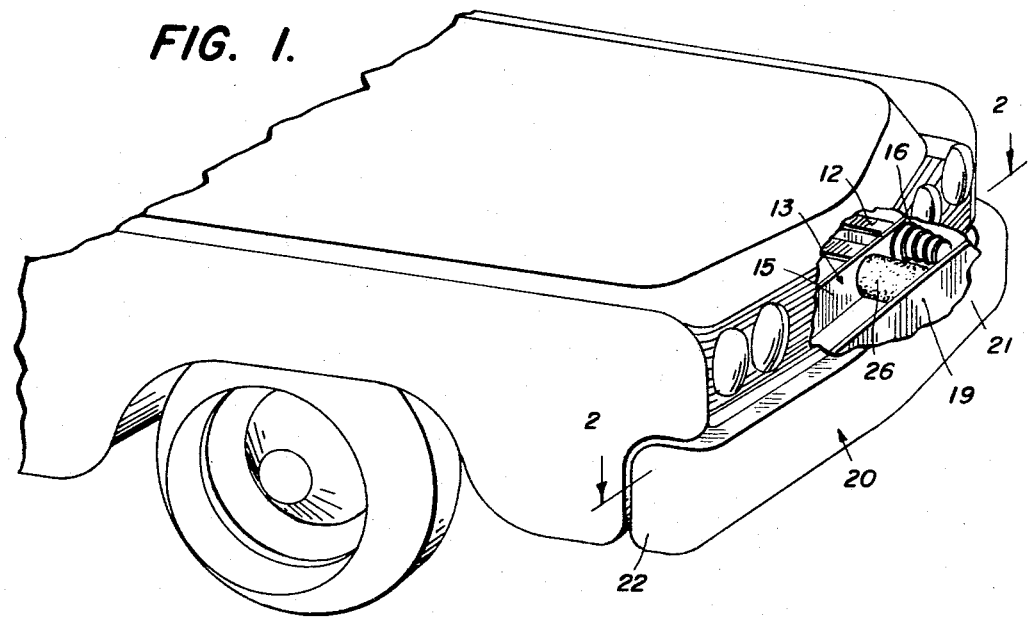
Figure 2:
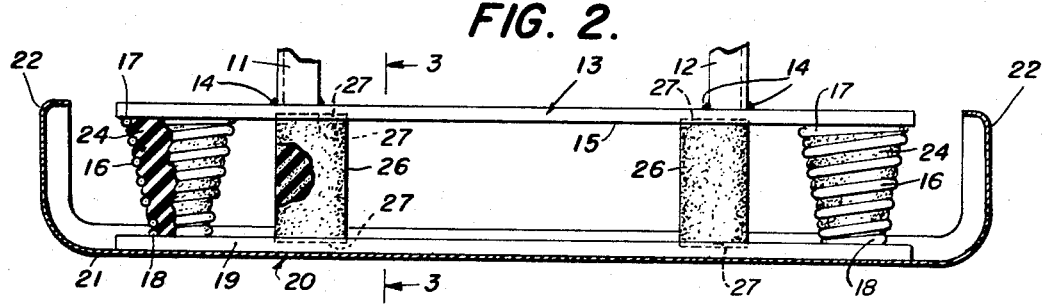
FIG. 2 is a cross-sectional view taken on the line 2—2 of FIG. 1.
Figure 3:
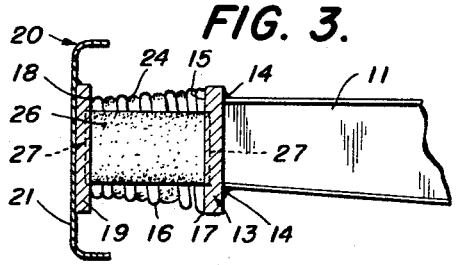
FIG. 3 is a vertical sectional view taken on the line 3—3 of FIG. 2.

In the drawings, the ends of the two main horizontal frame members 11 and 12 of a typical automobile are connected by a steel cross member 13, being attached for example by welds 14. Also attached to the cross member 13 on its forward face 15, by welds (or other suitable attachment means) at least two coiled steel springs 16, these being of the well-known conical compression type having the terminal spiral conformed to make a larger base 17 at one end and a smaller base 18 at the other, which bases are substantially parallel and perpendicular to the axis of the conical coil. The larger base 17 is attached, as by welding, to the cross member 13 previously described, the coils being disposed apart and near the ends of said cross member 13. The smaller bases 18 of the springs are attached, by welding, or by any other suitable means, to the base bar 19 of the bumper 20. The bumper 20 as shown consists of the base bar 19, the ornamental sheet metal cover 21, including the "wrap around" end portions 22. For use with my core-reinforced springs, I prefer that the sheet metal cover 21 be constructed of sufficiently heavy metal to provide a rigid structure, solidly reinforced by the base bar 19, so that if the collision impact is not directed wholly against the long face of the bumper, it will still be strong enough to transmit the blow to the spring members without being twisted or crumpled.

Each of the coiled springs 16, prior to attachment, is provided with a compressible core 24, which is preformed to completely fill the interior of the conical coiled spring when not in compressed condition. The core may be made of material generally known as "sponge rubber" but the actual composition may be any suitable rubber-like compressible, resilient material, such as synthetic rubbers sold under the trade names "Neoprene," "Koroseal," "Thiokol" and "Buna," for example. The particular material may be selected for its resistance to compressive strength, its freedom from deterioration, and its resistance to oil, etc. The term "sponge rubber" as used herein means any rubbery material having these defined properties.

When the coil springs 16 are at first compressed, as by an impact on the bumper 20, part of the force is absorbed by the compression of the core 24, and as the core is distorted, it bulges out through the openings between adjacent turns of the spring and this results in strengthening the coiled spring itself. There is therefore a continual increase in the resistance of the core-core assembly which results eventually in the complete absorbing of the shock of the impact.

The coil springs may be made of bars or wires of plain or alloy steel, and of the proper dimensions to meet the requirements of this application to automobile spring bumpers, according to known coil spring design principles.

The spring bumper structure may be strengthened in the space intermediate the coiled springs by means of sponge rubber blocks 26 disposed between the cross frame member 13 and the bumper base bar 19, recesses 27 being provided to secure the blocks in place. The number, size and resistance to compression of these blocks may be selected to serve the desired purpose, and the composition of the "sponge rubber" may be selected from several synthetic "rubbers" as noted for the cores 24.

Figure 4:
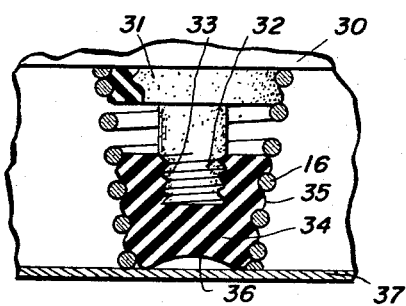
FIG. 4 is an alternative form of core-reinforced coiled spring arrangement.

An alternative form of coiled spring with a reinforcing core is shown in FIG. 4 in which the coil spring 16 is provided with a rigid plate 30 and an integral center plug 31 of a rigid molded synthetic plastic material. The end of the plug 31 is provided with coarse threads 32 which engage the threaded recess 33 provided in a sponge rubber core 34. The compressible resilient core 34 is molded with peripheral threads 35 arranged to conform to the spaces between turns of the coiled spring 16. There may also be provided on the end of the core which abuts the bearing plate 37, a spherical depression 36 which serves as a compression-suction cup to retard the movement in either direction.

The advantages of my invention will be apparent. The spring bumper arrangement of this invention will greatly reduce the personal danger to occupants of an automobile when it collides with another object, and the damage to the structure of the automobile, particularly to the frame structure, will be greatly reduced. My bumper structure may be applied both to the front and to the rear of the automobile, and may be so disposed, in relation to the body of the automobile, that there is no unusual appearance over the prevailing style for bumpers.

I claim:

1. For attachment to the longitudinal frame members of an automobile, a bumper structure consisting of a structural frame cross member attached to the ends of said longitudinal frame members, a bumper base bar disposed forwardly of said cross member, and attached to said cross member exclusively by at least two coiled spring structures disposed between and rigidly attached to said cross member and to said bumper base bar, each of said coiled spring structures consisting of a metallic conical coiled spring, and a compressible core of resilient rubber-like sponge material, said core completely filling the interior space of the metal coiled spring and abutting the faces of said cross member and said bumper base bar, each of said coiled springs being rigidly attached at its end coils respectively to the forward face of said cross member and to the rearward face of said bumper base bar, said springs constituting the sole attachment means of said bumper base bar to said cross member, and one or more blocks of sponge rubber disposed adjacent said coiled springs between said frame cross member and said bumper base bar, said blocks being held only at their contacting surfaces with said member and said bar.

References Cited

UNITED STATES PATENTS

| | | | |
|---|---|---|---|
| 85,938 | 1/1869 | Kirkpatrick. | |
| 97,645 | 12/1869 | Jeffries | 267—33 |
| 157,821 | 12/1874 | Hansell | 267—33 |
| 199,945 | 2/1878 | Vose | 213—40 |
| 1,299,876 | 4/1919 | Van Noort et al. | 152—6 |
| 1,318,314 | 10/1919 | Dixon | 293—85 |
| 1,504,548 | 8/1924 | Gentle | 293—85 X |
| 1,638,615 | 8/1927 | Bunis | 293—85 |
| 1,640,222 | 8/1927 | Slowik | 293—85 |
| 1,696,429 | 12/1928 | Christen | 293—85 X |
| 1,832,184 | 11/1931 | Christen | 293—85 |
| 2,127,219 | 8/1938 | Hirshfield | 267—33 X |
| 2,466,265 | 4/1949 | Noonan | 293—85 X |
| 2,469,596 | 5/1949 | Groom | 267—1 X |
| 2,588,171 | 3/1952 | Smith et al. | 267—33 |

FOREIGN PATENTS

| | | |
|---|---|---|
| 363,658 | 12/1931 | Great Britain. |

ARTHUR L. LA POINT, *Primary Examiner.*

H. BELTRAN, *Assistant Examiner.*